(12) United States Patent
Ikemura (10) Patent No.: US 9,393,719 B2
(45) Date of Patent: Jul. 19, 2016

(54) PNEUMATIC TIRE WITH SPECIFIED OUTER SURFACE

(75) Inventor: Koji Ikemura, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 431 days.

(21) Appl. No.: 13/637,585

(22) PCT Filed: Mar. 25, 2011

(86) PCT No.: PCT/JP2011/058377
§ 371 (c)(1),
(2), (4) Date: Oct. 19, 2012

(87) PCT Pub. No.: WO2011/118856
PCT Pub. Date: Sep. 29, 2011

(65) Prior Publication Data
US 2013/0068363 A1    Mar. 21, 2013

(30) Foreign Application Priority Data
Mar. 26, 2010    (JP) .................................. 2010-073477

(51) Int. Cl.
*B60C 11/00* (2006.01)
*B60C 13/00* (2006.01)
(Continued)

(52) U.S. Cl.
CPC ............... *B29C 33/3842* (2013.01); *B24C 1/00* (2013.01); *B24C 1/06* (2013.01); *B24C 1/10* (2013.01); *B29C 33/424* (2013.01); *B29C 37/0053* (2013.01); *B29D 30/0606* (2013.01); *B29D 30/0662* (2013.01); *B29D 30/72* (2013.01); *B60C 5/00* (2013.01); *B60C 11/00* (2013.01); *B60C 13/00* (2013.01); *B60C 13/001* (2013.04);
(Continued)

(58) Field of Classification Search
CPC   B60C 11/00; B60C 2011/0016; B60C 13/00; B60C 13/001; B60C 13/02; B60C 2013/005; B29D 2030/0616; B29C 37/0053; B29C 33/424
USPC ............................. 152/209.15, 525; 425/28.1
See application file for complete search history.

(56) References Cited

U.S. PATENT DOCUMENTS 2,090,278 A    8/1937 Willshaw
4,444,713 A *  4/1984 Egan et al.
(Continued)

FOREIGN PATENT DOCUMENTS

DE    10 2008 010 486 A1    9/2008
DE    10 2008 033 422 A1    2/2009
(Continued)

OTHER PUBLICATIONS

English machine translation of JP 2003-252012 A, Sep. 9, 2003.*
(Continued)

*Primary Examiner* — Adrienne C Johnstone
(74) *Attorney, Agent, or Firm* — Oliff PLC (57) ABSTRACT

A pneumatic tire has an outer surface with an arithmetical mean roughness Ra in the range of 0.1 μm to 0.6 μm when a reference length Lr is 20 μm, wherein the outer surface has an irregularity diameter in the range of 40-230 μm and an irregularity depth in the range of 3-22 μm. A method of manufacturing a tire vulcanization mold includes propelling spherical abrasive grains onto the surface of the mold under the condition that a propelling pressure is in the range of 0.1-0.6 MPa, so as to process the surface of the mold.

2 Claims, 6 Drawing Sheets

(51) Int. Cl.
    *B29C 33/42*     (2006.01)
    *B29C 37/00*     (2006.01)
    *B29C 33/38*     (2006.01)
    *B24C 1/10*     (2006.01)
    *B24C 1/06*     (2006.01)
    *B29D 30/06*     (2006.01)
    *B29D 30/72*     (2006.01)
    *B60C 5/00*     (2006.01)
    *B24C 1/00*     (2006.01)
    *B29L 30/00*     (2006.01)

(52) U.S. Cl.
    CPC ..... *B29D 2030/0616* (2013.01); *B29L 2030/00* (2013.01); *B60C 2011/0016* (2013.04); *B60C 2013/005* (2013.04); *Y10T 152/10495* (2015.01)

(56) References Cited

U.S. PATENT DOCUMENTS

| | | | |
|---|---|---|---|
| 4,966,832 A | 10/1990 | Shigesada | |
| 5,932,026 A | 8/1999 | Trampusch | |
| 6,554,037 B2 * | 4/2003 | Bataille et al. | 152/525 |
| 6,817,848 B2 | 11/2004 | Ishihara | |
| 7,972,678 B2 | 7/2011 | Martelli | |
| 2002/0119209 A1 | 8/2002 | Tanaka | |
| 2003/0230370 A1 * | 12/2003 | Stubbendieck et al. | 152/525 |
| 2004/0187997 A1 | 9/2004 | Paturle et al. | |
| 2007/0155290 A1 | 7/2007 | Kata et al. | |
| 2008/0216932 A1 * | 9/2008 | Fujikawa et al. | |
| 2008/0283169 A1 * | 11/2008 | Sato et al. | |
| 2009/0008015 A1 * | 1/2009 | Itoi | |
| 2009/0032159 A1 * | 2/2009 | Nakamura | |
| 2009/0032172 A1 * | 2/2009 | Nakamura | |
| 2009/0032173 A1 * | 2/2009 | Nakamura | |
| 2009/0032174 A1 * | 2/2009 | Nakamura | |
| 2009/0049717 A1 | 2/2009 | Kayashima | |
| 2014/0360638 A1 | 12/2014 | Watabe | |

FOREIGN PATENT DOCUMENTS

| | | | |
|---|---|---|---|
| GB | 2 010 755 A | * | 7/1979 |
| JP | A-2000-142026 | | 5/2000 |
| JP | 2001-330979 A | | 11/2001 |
| JP | 2002-030431 A | | 1/2002 |
| JP | 2003-263020 A | | 9/2003 |
| JP | 2003252012 A | * | 9/2003 |
| JP | A-2003-300214 | | 10/2003 |
| JP | A-2004-17964 | | 1/2004 |
| JP | A-2007-320248 | | 12/2007 |
| JP | 2008174015 A | * | 7/2008 |
| JP | 2008-201384 A | | 9/2008 |
| JP | A-2008-273505 | | 11/2008 |
| JP | A-2009-67378 | | 4/2009 |
| JP | A-2009-190526 | | 8/2009 |
| JP | 2009-292874 A | | 12/2009 |

OTHER PUBLICATIONS

Jul. 5, 2011 International Search Report issued in International Application No. PCT/JP2011/058377 (with translation).

Dec. 16, 2014 Office Action issued in Japanese Patent Application No. 2012-507127.

Oct. 21, 2002, XP 55103739, "Surface Roughness Testing," retrieved from the internet on Feb. 21, 2014: URL:http://tesatool.com/pdf_files/catalog_surface.pdf, pp. 1-6.

Feb. 28, 2014 Extended European Search Report issued in EP 11759654.4.

Nov. 5, 2015 Office Action issued in U.S. Appl. No. 14/479,757.

"Surface Roughness Measurement," Bulletin No. 1984, Mitutoyo America Corporation, pp. 1-8, Dec. 2009.

Aug. 18, 2015 Office Action issued in Japanese Patent Application No. 2012-507127.

* cited by examiner

PNEUMATIC TIRE WITH SPECIFIED OUTER SURFACE

TECHNICAL FIELD

The present invention relates to a pneumatic tire and a method of processing the surface of a tire vulcanization mold. In particular, the present invention relates to a pneumatic tire that has an appropriate gloss and a deeply-black and moist texture on its surface, thereby achieving a good appearance, and to a method of manufacturing a tire vulcanization mold that is capable of forming such a pneumatic tire.

BACKGROUND ART

In general, a tire vulcanization mold is firstly made by casting, and then is finished by subjecting its surface to an abrasive blasting process using abrasive grains made of alumina or the like.

On the surface of the mold that has been subjected to an abrasive blasting process, irregularities of random diameters and depths are formed. Once these random irregularities are transferred to the surface of the vulcanized tire, the tire surface disorderly diffuses light, and thereby the tire ends up having no gloss while having a black and yet coarse texture.

Herein, the term "no gloss" refers to the condition in which the value measured by a gloss meter is in the range of 0.1 to less than 1. A tire having no gloss often has a coarse texture on its surface.

In this regard, for example, Patent Document 1 (JP 2000-142026 A) discloses a pneumatic tire wherein the surface roughness (RaT) of the molded tire is in the range of 1.5-20 µm when it is measured by a stylus-type surface roughness tester. Patent Document 1 describes that the surface gloss of the molded tire may be enhanced and the appearance of the tire may be improved.

Patent Document 2 (JP 2004-017964 A) discloses a tire mold having a radially inner surface for forming a tread and a pair of sidewalls, the tire mold comprising: at least one sidewall forming surface having a surface finish of less than 0.381 microns. There is described that a highly light reflective surface on a tire sidewall is achieved in a novel way. The resultant tire has highly light reflective surfaces achieved in a way that is clearly recognizable regardless of the observer's relative position.

The art disclosed in aforementioned Patent Documents 1 and 2 enhances the gloss of the tire surface and enhances the reflectance of the tire surface, by controlling the surface roughness Ra, thereby improving the appearance of the tire.

The inventors manufactured tires using two types of molds that were subjected to different surface processes and examined the surface roughness Ra and gloss of the tires. They found out that the tires with substantially equal surface roughness Ra did not always have the same measurement gloss value. The evaluation results are shown in Table 1.

In Table 1, Process A indicates an abrasive blasting process performed on a surface of a tire mold using alumina abrasive grains, and Process B indicates an abrasive blasting process performed on a surface of a tire mold using spherical abrasive grains.

TABLE 1

| Processing method | Process A | Process B |
| --- | --- | --- |
| Surface roughness Ra | 3.72 µm | 3.42 µm |
| Tire gloss | 0.4 | 2.7 |

According to Table 1, out of two types of surface processing methods, i.e. Process A and Process B, by which tires of substantially equal surface roughness Ra are obtained, Process B achieves the tire gloss of 2.7, which is good, while Process A achieves the tire gloss of 0.4, which is insufficient.

According to the foregoing results, in order to control the tire gloss so as to constantly achieve a tire with the gloss of not less than 1, it is not sufficient to merely maintain the surface roughness Ra of the tire at a constant value.

Patent Document 3 (JP 2003-300214 A) discloses a tire vulcanizing mold having a molding surface for vulcanizing a tire, wherein at least a part of the molding surface is provided with a rough-surface molding surface, which is configured such that its ten points mean roughness Rz is 5-100 µm and it has the surface roughness such that its average distance between peaks in a local area S is 20-150 µm. Patent Document 3 describes that, since the mold has the rough-surface molding surface which has limited surface roughness, it is possible to form a pneumatic tire comprising, on its outer surface, a rough-surface portion having substantially the same surface roughness as the rough-surface molding surface. Such a rough-surface portion can diffusely reflect extraneous light to a preferable extent, thereby enabling the tire to appear deeply black. Accordingly, additives seeping through the tire etc. may be less visible and the appearance of the tire may be improved over a long period of time.

The inventors manufactured tires using the tire vulcanizing mold having the structure of the invention disclosed in aforementioned Patent Document 3 and evaluated the surface condition and tire gloss of the tires. They found out that, when such a tire vulcanizing mold was used, tires having no gloss while having a black and yet coarse texture were sometimes manufactured. The evaluation results are shown in Table 2,

TABLE 2

| | |
| --- | --- |
| Ten points mean roughness Rz of the mold | 13.1 µm |
| Average distance between peaks in a local area S of the mold | 48.4 µm |
| Condition of the tire surface | black and yet coarse surface texture |
| Tire gloss | 0.4 |

According to the results shown in Table 2, the tire gloss cannot be sufficiently controlled by adjusting parameters such as the ten points mean roughness Rz and the average distance between peaks in a local area S of the mold, and thereby the tires sometimes end up having an insufficient gloss while having a black and yet coarse texture.

Accordingly, it may be concluded that there are other factors than the aforementioned parameters that cause inconsistency in the tire gloss, and it is impossible to constantly obtain tires with an appropriate gloss without controlling these factors.

On the contrary, if the gloss of the tire surface is too high, in other words if the gloss of the tire surface is not less than 6.0, the tire ends up having a whitish, shiny appearance, which is not preferable.

Further, even if the gloss is appropriate, as discussed above, the tire surface may have a coarse texture, in which case the appearance of the tire is not preferable. In this regard, it may be concluded that the factor lies in the parameters for roughness of the tire surface.

In general, a preferable appearance of a tire is achieved when the tire surface has an appropriate gloss and has a deeply-black and moist texture. However, as discussed above, it is impossible to constantly supply such a tire using the prior art disclosed in Patent Documents 1-3.

Therefore, in order to constantly supply tires with a good appearance, it is required to contemplate a method of manufacturing a tire vulcanization mold in which roughness parameters for the tire surface that determine the gloss and texture of the tire surface are adjusted and in which such roughness parameters may be appropriately transferred to the tire.

Patent Documents

Patent Document 1: JP 2000-142026 A
Patent Document 2: JP 2004-017964 A
Patent Document 3: JP 2003-300214 A

SUMMARY OF THE INVENTION

Problem to be Solved by the Invention

For the forgoing reasons, the present invention aims to provide a pneumatic tire having an appropriate gloss and a deeply-black and moist texture on its surface, thereby having a good appearance, and to provide a method of manufacturing a tire vulcanization mold by which such pneumatic tires may be constantly manufactured.

Means for Solving the Problem

The inventors contemplated a way to solve the aforementioned problem, and arrived at the present invention based upon the findings that: it is effective to adjust the surface roughness Ra that is calculated with a reference length Lr of a minute value, for controlling the gloss of the tire surface; and by defining the condition of the tire surface from a more macro perspective compared to the surface roughness Ra, it is possible to provide the tire surface with a deeply-black and moist texture.

Conventionally, the surface roughness Ra of a tire was typically measured with a reference length Lr in the range of about 800-2500 µm.

The summary of the present invention which solves the aforementioned problem is as follows. Namely, the present invention provides a pneumatic tire that comprises a tread portion and side portions. At least one of the tread portion and the side portions has an outer surface having an arithmetical mean roughness Ra in the range of 0.1 µml to 0.6 µm, preferably in the range of 0.381-0.6 when a reference length Lr is 20 µm. An irregularity diameter of the outer surface is in the range of 40-230 µm. An irregularity depth of the outer surface is in the range of 3-22 µm.

Herein, the term "arithmetical mean roughness Ra" refers to the roughness parameters "an arithmetical mean height Ra" or "an arithmetical mean roughness Ra" defined in Japan Industrial Standards JIS B 0601 (2001). In this invention, the arithmetic mean roughness Ra was measured using a laser microscope (VK-9710) by Keyence Corporation.

Figure 6:
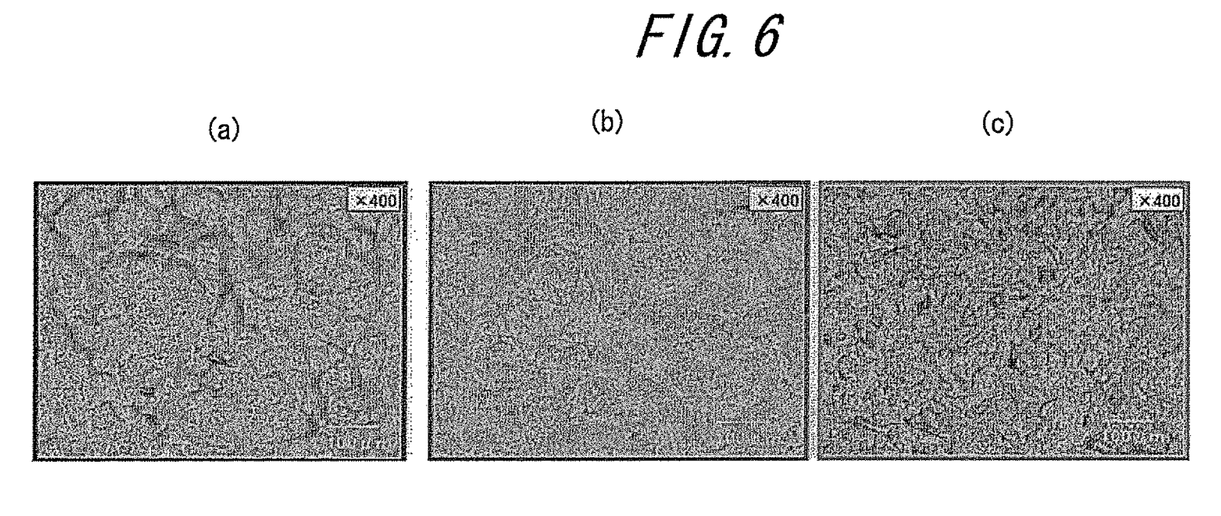
FIGS. 6(a)-6(c) are enlarged views showing examples of irregularities of a tire outer surface.

In the present invention, the term "irregularities" on an outer surface of a tire refers to the irregularities that are formed when the scars formed on the surface of a vulcanizing mold by the abrasive material, as shown in FIGS. 6(a)-(c) for example, are transferred onto the outer surface of the tire. The scars are formed by subjecting the surface of the mold to an abrasive blasting process using a stream of either fine spherical abrasive material, relatively large spherical abrasive material or polygonal abrasive material. In the present invention, the term "an irregularity diameter" refers to the size of the irregularities in their diameter direction, and the term "an irregularity depth" refers to the depth of the irregularities.

In the method of manufacturing a tire vulcanization mold according to the present invention, the mold has a first portion corresponding to a tire tread portion, and has second and third portions corresponding to tire side portions. Each of the first, second and third portions has a surface, and the method includes propelling spherical abrasive grains onto at least one of the surfaces of the first, second and third portions of the mold under the condition that a propelling pressure is in the range of 0.1-0.6 MPa, so as to process the surface of the mold.

In the aforementioned manufacturing method, it is preferable that the abrasive grains with a grain diameter of not more than 850 µm are propelled onto the surface of the mold.

It is preferable that the abrasive grains are propelled onto the surface of the mold at the propelling pressure of 0.1 MPa to 0.2 MPa, particularly of 0.1 MPa.

Effects of the Invention

According to the pneumatic tire of the present invention, since the arithmetical mean roughness Ra of an outer surface of at least one of a tread portion and side portions, with the reference length Lr of 20 µm, is in the range of 0.1-0.6 µm, it is possible to constantly achieve the tire gloss of not less than 1.

Further, since the irregularity diameter of the tire surface is in the range of 40-230 µm and the irregularity depth of the tire surface is in the range of 3-22 µm, it is possible to eliminate a coarse texture from the tire surface and provide the tire surface with a deeply-black and moist texture, thereby achieving a good appearance of the tire.

In the method of manufacturing a tire vulcanization mold according to the present invention, the mold has a first portion corresponding to a tire tread portion, and has second and third portions corresponding to tire side portions. At least one of the first, second and third portions has a surface, and the method includes propelling spherical abrasive grains onto the surface of the mold under the condition that a propelling pressure is in the range of 0.1-0.6 MPa, so as to process the surface of the mold. According to the tire vulcanization mold manufactured by this manufacturing method, it is possible to constantly manufacture tires in which the arithmetical mean roughness Ra of the outer surface of at least one of the tread portion and side portions, when the reference length Lr is 20 µm, is in the range of 0.1-0.6 µm.

In the method of manufacturing a tire vulcanization mold according to the present invention, if the abrasive grains to be propelled have the grain diameter of not more than 850 µm, it is possible to manufacture a device for tire vulcanization that can constantly manufacture tires having a more deeply-black and moist texture on the surface of the tread portion or side portions.

Additionally, if the propelling pressure of the abrasive grains is in the range of 0.1 MPa to 0.2 MPa, more preferably at 0.1 MPa, it is possible to manufacture a tire vulcanization mold that can manufacture tires with a better appearance.

BEST MODE FOR CARRYING OUT THE INVENTION

Figure 1:
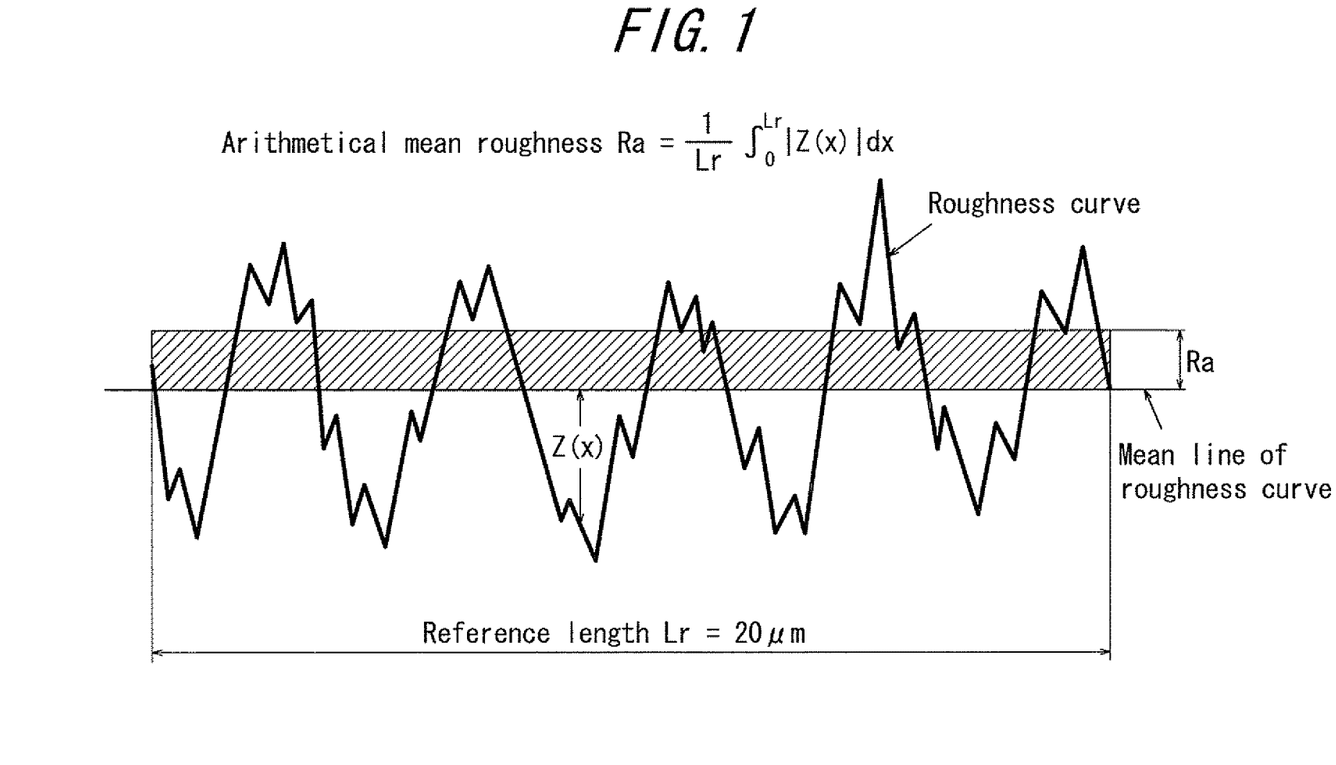
FIG. 1 is a diagram showing a roughness curve for explaining the arithmetical mean roughness Ra of a tire surface.

The present invention will be explained in detail herein below with reference to the drawings. FIG. 1 shows a roughness curve of a tire surface when a reference length Lr is 20 μm. In FIG. 1, Z(x) indicates the deviation of the roughness curve from a mean line of the roughness curve.

The term "arithmetical mean roughness Ra" in a zone extending along the reference length Lr indicates the mean of the absolute value of Z(x) in the zone, and is calculated by using the following Equation (1):

$$Ra = \frac{1}{Lr} \int_0^{Lr} |Z(x)| dx \quad (1)$$

In the pneumatic tire of the present invention, it is required that the arithmetical mean roughness Ra of the outer surface of at least one of a tread portion and side portions, that is calculated by using the above Equation (1), when the reference length Lr is 20 μm, is in the range of 0.1-0.6 μm. Accordingly, the gloss of the tire surface may be not less than 1.

Figure 2:
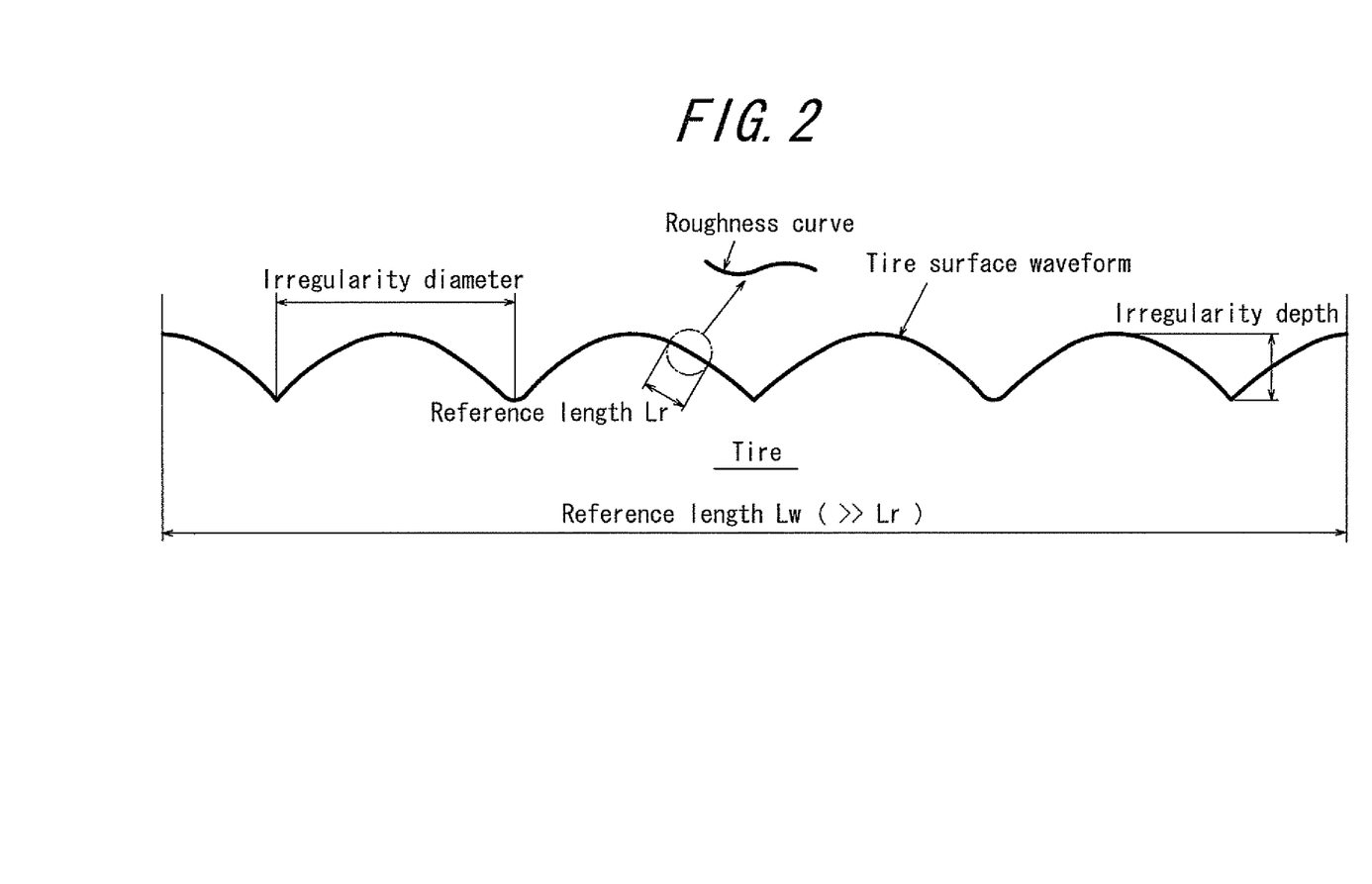
FIG. 2 is a sectional view schematically showing the condition of a tire surface for explaining the relationship between a reference length Lr for the roughness curve and a reference length Lw for measuring an irregularity diameter and an irregularity depth.

FIG. 2 schematically shows the condition of a tire surface from a more macro point of view. As shown in FIG. 2, aside from the roughness curve, the tire surface is normally formed with irregularities when observed with a reference length Lw that is longer than the reference length Lr. The texture of the tire surface depends on the diameter and depth of the irregularities.

In the pneumatic tire of the present invention, in which the aforementioned arithmetical mean roughness Ra is in the range of 0.1-0.6 μm, it is required that the irregularity diameter is in the range of 40-230 μm and the irregularity depth is in the range of 3-22 μm. Accordingly, the tire surface may have a deeply-black and moist texture.

EXAMPLES

A plurality of molds for tire vulcanization, which were subjected to different surface processes respectively, were used to manufacture tires. The arithmetical mean roughness Ra with the reference length Lr of 20 μm, the irregularity diameter and the irregularity depth of the surface of each of the manufactured tires were measured. Further, sensory evaluation was conducted on the condition of the tire surface. The following Tables 4-6 show the evaluation results.

Processes A-H, shown in the following tables, were performed using different shapes, grain diameters and propelling pressures of the abrasive grains, as shown in Table 3. For the Processes A-H, the propelling time was 30 seconds, respectively.

TABLE 3

|  | Process A (Conventional) | Process B | Process C | Process D |
|---|---|---|---|---|
| Shape of abrasive grains | Polygonal | Spherical | Spherical | Spherical |
| Grain diameter (μm) | 60-80 | 150-180 | 300-425 | 425-600 |
| Propelling pressure (MPa) | 0.6 | 0.2 | 0.2 | 0.2 |

|  | Process E | Process F | Process G | Process H |
|---|---|---|---|---|
| Shape of abrasive grains | Spherical | Spherical | Spherical | Spherical |
| Grain diameter (μm) | 600-850 | 700-1000 | 700-1000 | 700-1000 |
| Propelling pressure (MPa) | 0.2 | 0.2 | 0.4 | 0.1 |

TABLE 4

|  | Process A (Conventional) | Process B | Process C | Process D |
|---|---|---|---|---|
| Tire gloss | 0.4-0.5 | 2.8-3.0 | 2.3-2.6 | 2.5-3.0 |
| Ra (μm) | 0.73-1.56 | 0.16-0.30 | 0.13-0.24 | 0.12-0.19 |
| Irregularity diameter (μm) | 8.74-30.58 | 45.27-74.26 | 94.64-142.57 | 121.76-160.37 |
| Irregularity depth (μm) | 5.27-9.83 | 3.2-9.75 | 8.31-20.23 | 10.60-14.83 |
| Condition of tire surface (Sensory evaluation) | Black and yet coarse | Black and moist | Black and moist | Black and moist |

TABLE 5

|  | Process E | Process F | Process G | Process H |
|---|---|---|---|---|
| Tire gloss | 2.7-3.1 | 2.9-3.2 | 2.3-2.5 | 3.0-4.0 |
| Ra (μm) | 0.12-0.33 | 0.15-0.30 | 0.26-0.38 | 0.12-0.19 |
| Irregularity diameter (μm) | 182.14-209.86 | 194.02-262.33 | 181.15-355.28 | 121.76-160.37 |
| Irregularity depth (μm) | 12.1-17.71 | 10.33-23.84 | 11.52-28.79 | 10.60-14.83 |
| Condition of tire surface (Sensory evaluation) | Black and moist | Black and yet coars | Black and yet coarse | Black and moist |

TABLE 6

| Grain diameter of abrasive grains (μm) | 150-180 | 300-425 | 425-600 | 600-850 | 710-1000 |
|---|---|---|---|---|---|
| Specific gravity of abrasive grains | 2.5 | 3.85 | 3.85 | 3.85 | 2.5 |
| Mohs hardness of abrasive grains | 6.5 | 9 | 9 | 9 | 6.5 |
| Propelling distance (mm) | 150 | 150 | 150 | 150 | 150 |
| Propelling time (s) | 30 | 30 | 30 | 30 | 30 |

TABLE 6-continued

| | | | | | | |
|---|---|---|---|---|---|---|
| Propelling pressure of 0.1 MPa | Irregularity diameter (μm) | 49.0 | 113.4 | 136.4 | 199.7 | 222.7 |
| | Irregularity depth (μm) | 3.7 | 8.7 | 10.1 | 14.7 | 12.0 |
| Propelling pressure of 0.2 MPa | Irregularity diameter (μm) | 54.0 | 126.6 | 150.9 | 200 | 253.8 |
| | Irregularity depth (μm) | 5.1 | 13.5 | 15.7 | 21.1 | 21.8 |
| Propelling pressure of 0.4 MPa | Irregularity diameter (μm) | 59.2 | 144.3 | 179.4 | 262.6 | 310.9 |
| | Irregularity depth (μm) | 10.1 | 21.0 | 21.6 | 25.3 | 34.4 |
| Propelling pressure of 0.6 MPa | Irregularity diameter (μm) | 71.4 | 177.8 | 190.2 | 312.5 | 354.0 |
| | Irregularity depth (μm) | 12.2 | 31.5 | 24.7 | 35.0 | 39.1 |

According to Tables 4 and 5, by using the molds for tire vulcanization that have been subjected to Processes B-H, in which the shape of the abrasive grains is spherical, it is possible to obtain tires in which the arithmetical mean roughness Ra of the surface, when the reference length Lr is 20 μm, is not more than 0.6 μM.

Further, by using the molds for tire vulcanization that have been subjected to Processes B-E, in which the grain diameter of the abrasive grains is not more than 850 μm, it is possible to obtain tires that have a black and moist texture and a good appearance.

As to the molds for tire vulcanization that were subjected to Processes F-H, in which the grain diameter of the abrasive grains was large, being 700-1000 μm, in a case where the propelling pressure was high, the surfaces of the manufactured tires had a coarse texture, while in a case of Process H, in which the propelling pressure was 0.1 MPa, tires having a black and moist texture were obtained.

Accordingly, by arranging the shape of the abrasive grains to be spherical, it is possible to manufacture tires having a deeply-black and moist texture, even when the grain diameter of the abrasive grains is large, as long as the propelling pressure is low.

According to Table 6, using the molds for tire vulcanization that were is subjected to the surface processes under respective conditions, tires, in which the irregularity diameter of the surface was in the range of 40-230 μm and the irregularity depth of the surface was in the range of 3-22 μm, were manufactured, except for the case where the grain diameter of the abrasive grains was 600-850 μm and the propelling pressure was not less than 0.4 MPa, and the case where the grain diameter of the abrasive grains was 710-1000 μm and the propelling pressure was not less than 0.2 MPa.

By controlling the propelling pressure and the grain diameter, a desired irregularity diameter and irregularity depth may be obtained.

All tires, in which the irregularity diameter and irregularity depth were within the aforementioned ranges, had a deeply-black and moist texture on their surfaces and a good appearance.

Tires A-C, which had, on their tire surfaces, different arithmetical mean roughness Ra' with the reference length Lr of 800 μm and arithmetical mean roughness Ra with the reference length Lr of 20 μm, were manufactured. Then, the gloss of the tire surfaces and the condition of the tire surfaces were evaluated. The evaluation results shown in the following Table 7 were obtained.

Figure 3:
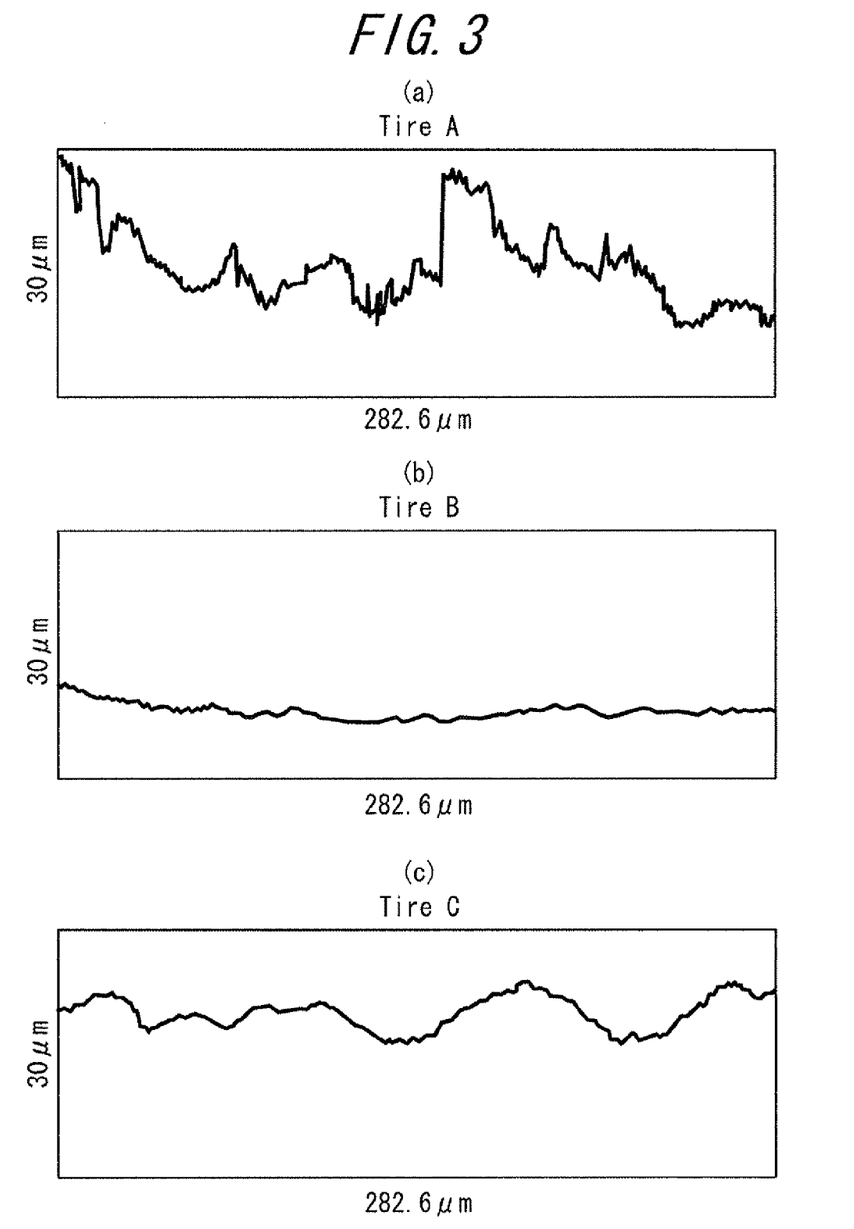
FIG. 3 shows a surface roughness curve of each of the tires used in the examples of the present invention.

The waveforms of curves of the surface roughness measured with respect to Tires A-C are shown in FIGS. 3(a)-3(c), respectively.

TABLE 7

| | Tire A | Tire B | Tire C |
|---|---|---|---|
| Method of processing the surface of each mold for respective tire | Process A | Mirror processing | Process B |
| Waveform of the surface roughness curve of the tire surface | FIG. 3(a) | FIG. 3(b) | FIG. 3(c) |
| Arithmetical mean roughness Ra' when the reference length Lr is 800 μm | 3.72 | 0.63 | 3.42 |
| Arithmetical mean roughness Ra when the reference length Lr is 20 μm | 1.11 | 0.05 | 0.30 |
| Tire gloss | 0.4 | 8.3 | 2.7 |
| Condition of tire surface (Sensory evaluation) | Black and yet coarse | Whitish and shiny | Black and moist |

According to Table 7, Tire A has a large arithmetical mean roughness Ra, with the reference length Lr of 20 μm, that is 1.11. For this reason, although Tire A has the arithmetical mean roughness Ra', with the reference length Lr of 800 μm, that substantially equals to that of Tire C, the tire gloss of Tire A is insufficient, being 0.4. Further, the tire surface of Tire A has a black and yet coarse texture. Accordingly, Tire A does not have a good appearance.

Tire B has a small arithmetical mean roughness Ra, with the reference length Lr of 20 μm, that is 0.05. Accordingly, Tire B has an overly high tire gloss and a whitish and shiny texture, and therefore does not have a good appearance.

On the other hand, Tire C, in which the arithmetical mean roughness Ra, with the reference length Lr of 20 μm, was in the range of 0.1 μm to 0.6 μm, had an appropriate gloss and a deeply-black and moist texture, and therefore had a good appearance.

Further, a plurality of tires which had, on their tire surfaces, different arithmetical mean roughness Ra, with the reference length Lr of 20 μm, were manufactured, and then the relationship between the arithmetical mean roughness Ra and the tire gloss was evaluated. The evaluation results shown in the graph of FIG. 4 were obtained.

Figure 4:
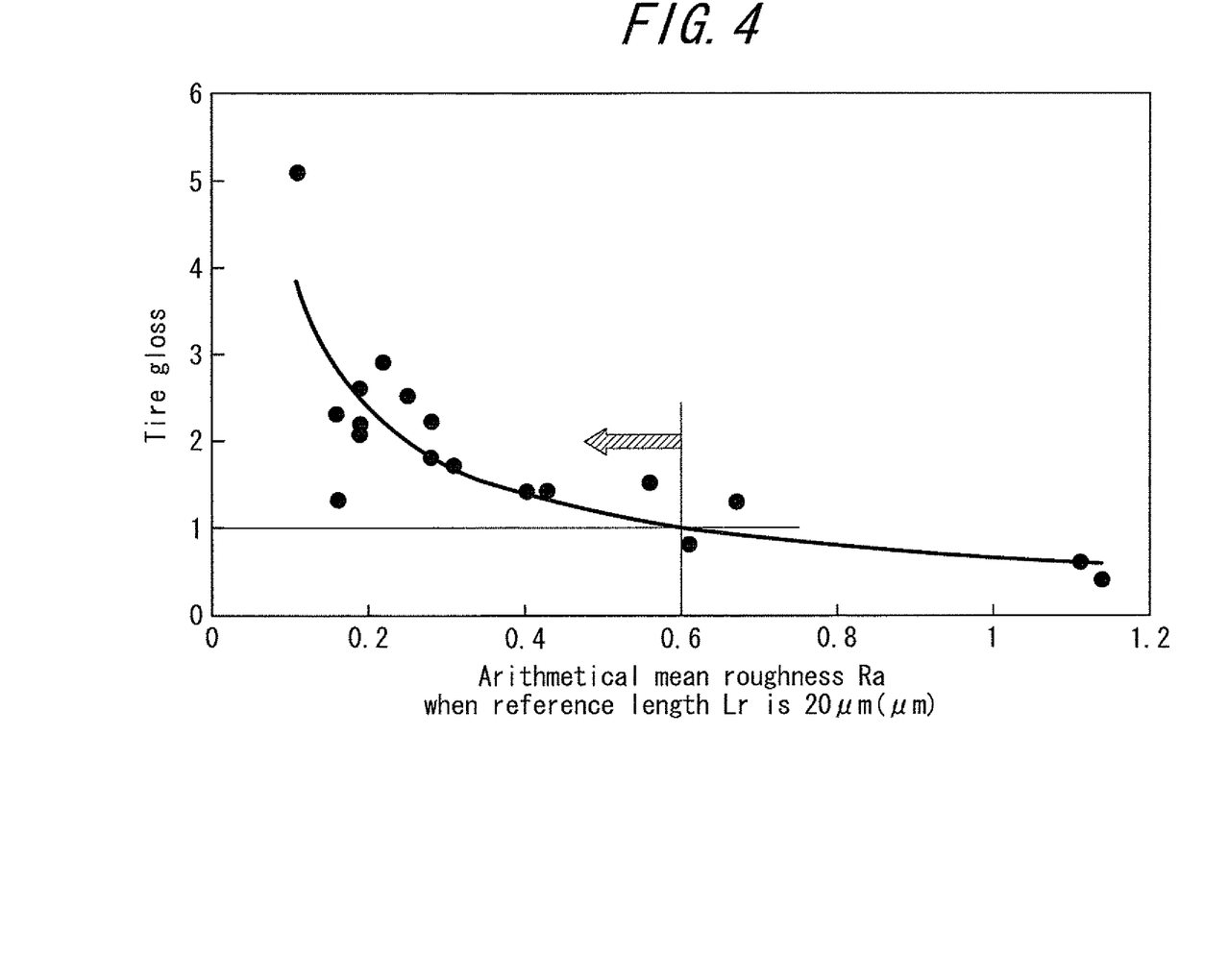
FIG. 4 is a graph showing the relationship between the arithmetical mean roughness Ra of a tire surface with the reference length Lr of 20 µm, and the tire gloss.

According to FIG. 4, by configuring the arithmetical mean roughness Ra of the tire surface, with the reference length Lr of 20 μm, to be not more than 0.6 μm, the gloss of the tire surface may be not less than 1.

Further, a plurality of tires, which had, on their tire surfaces, the arithmetical mean roughness Ra in the range of 0.1 μm to 0.6 μm, with the reference length Lr of 20 μm, and had different irregularity diameters and irregularity depths on their tire surfaces, were evaluated on the condition of their tire surfaces. The evaluation results shown in the following Table 8 were obtained.

TABLE 8

|  | Conventional Example tire 1 | Inventive Example tire 1 | Inventive Example tire 2 | Inventive Example tire 3 | Comparative Example tire 1 |
| --- | --- | --- | --- | --- | --- |
| Method of processing the surface of each mold for respective tire | Process A | Process B | Process C | Process D | Process F |
| Condition of tire surface (Sensory evaluation) | Black and yet coarse | Black and moist | Black and moist | Black and moist | Deepest black and yet very coarse |
| Irregularity diameter | 9-36 | 40-85 | 100-169 | 150-230 | 220-360 |
| Irregularity depth | 8-18 | 3-10 | 9-21 | 15-22 | 18-30 |

According to Table 8, Conventional Example tire 1 with a small irregularity diameter and a small irregularity depth had a black and yet coarse texture on its tire surface. Comparative Example tire 1 with a large irregularity diameter and a large irregularity depth had a deepest-black and yet very coarse texture on its surface. Therefore, none of the tires had a good appearance.

On the contrary, each of Inventive tires 1-3, which had the irregularity diameter and irregularity depth that fell under the scope of the present invention, had a deeply-black and moist texture, and therefore had a good appearance.

From the foregoing evaluation results and the data of Tables 3, 4 and 5, the ranges of the irregularity diameter and irregularity depth which provided a tire surface in a good condition were extracted. The region shown in FIG. 5 was obtained.

Figure 5:
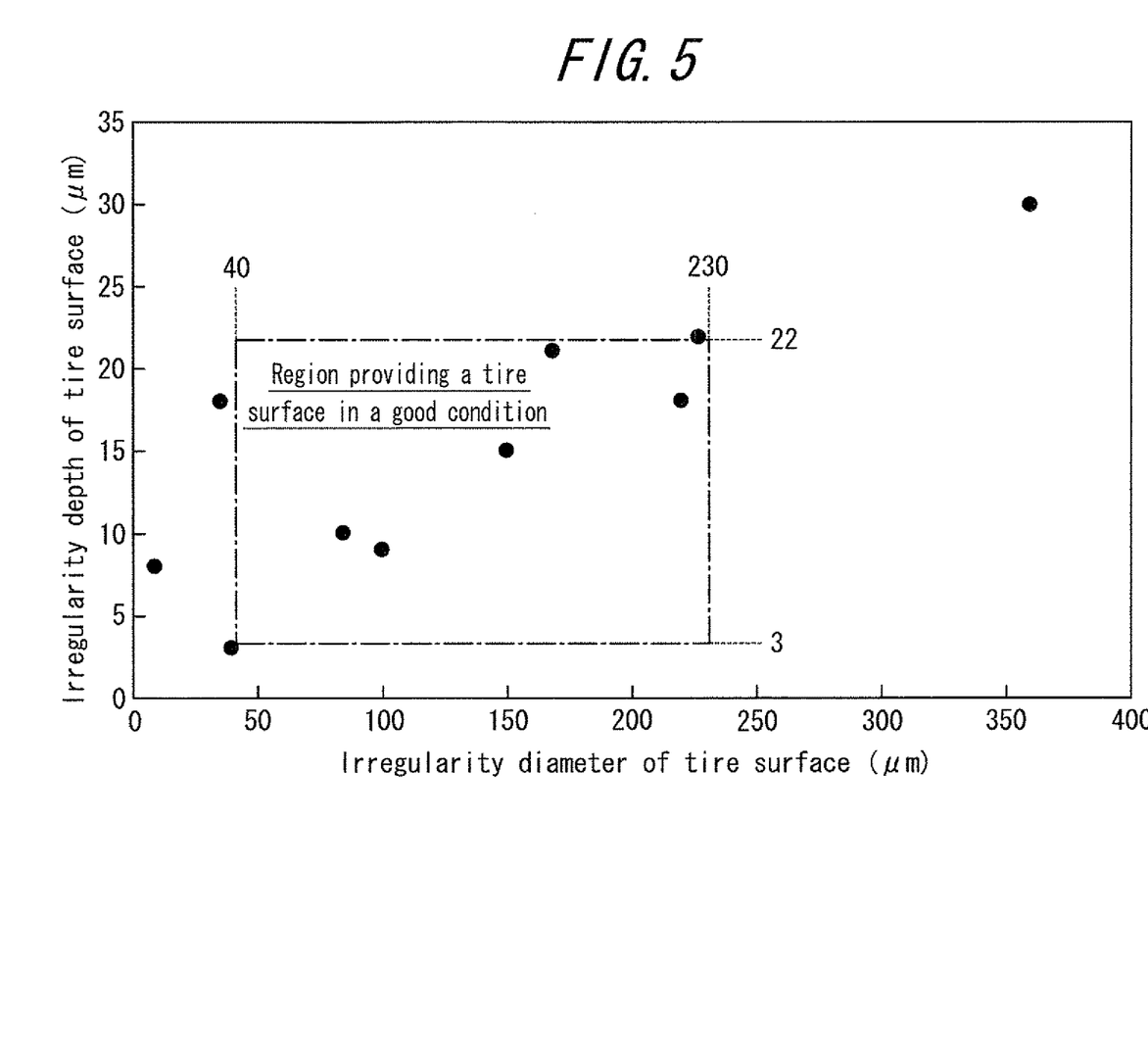
FIG. 5 is a diagram showing the ranges of an irregularity diameter and irregularity depth which provide a tire surface in a good condition.

FIG. 5 is a scatter plot showing the mean values of five measurement values of the irregularity diameter and irregularity depth, respectively.

The condition of the tire surface was determined either good or bad, by five panelists through sensory evaluation.

The invention claimed is:

1. A pneumatic tire comprising:
    a tread portion and side portions, wherein:
        at least one of the tread portion and the side portions has an outer surface with: (i) an arithmetical mean roughness Ra in the range of 0.1 μm to 0.6 μm when a reference length Lr is 20 μm, and (ii) an arithmetical mean roughness Ra' outside the range of 0.1 μm to 0.6 μm when the reference length Lr is 800 μm, and
        the outer surface has an irregularity diameter in the range of 40-230 μm and an irregularity depth in the range of 3-22 μm.

2. The pneumatic tire according to claim 1, wherein the arithmetical mean roughness Ra is in the range of 0.381 μm to 0.6 μm.

* * * * *